(12) United States Patent
Theuss

(10) Patent No.: US 11,143,626 B2
(45) Date of Patent: Oct. 12, 2021

(54) PHOTO-ACOUSTIC GAS SENSOR WITH OPTIMAL REFERENCE PATH LENGTH

(71) Applicant: Infineon Technologies AG, Neubiberg (DE)

(72) Inventor: Horst Theuss, Wenzenbach (DE)

(73) Assignee: Infineon Technologies AG, Neubiberg (DE)

( * ) Notice: Subject to any disclaimer, the term of this patent is extended or adjusted under 35 U.S.C. 154(b) by 274 days.

(21) Appl. No.: 16/245,873

(22) Filed: Jan. 11, 2019

(65) Prior Publication Data

US 2020/0225194 A1 Jul. 16, 2020

(51) Int. Cl.
*G01N 29/24* (2006.01)
*G01N 29/032* (2006.01)

(52) U.S. Cl.
CPC ....... *G01N 29/2425* (2013.01); *G01N 29/032* (2013.01); *G01N 2291/021* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,360,417 B2* | 6/2016 | Disch | ............. | G01N 21/3504 |
| 9,513,261 B2* | 12/2016 | Dehe | ............. | G01N 29/2425 |
| 10,241,088 B2* | 3/2019 | Theuss | ............. | G01N 29/2425 |
| 10,352,910 B2* | 7/2019 | Glacer | ............. | G01N 29/2425 |
| 10,365,208 B2* | 7/2019 | Kolb | ............. | G01N 29/30 |
| 10,451,589 B2* | 10/2019 | Tumpold | ............. | G01N 29/2418 |
| 10,458,900 B2* | 10/2019 | Marta | ............. | G01N 21/1702 |
| 10,495,612 B2* | 12/2019 | Dehe | ............. | G01N 29/30 |
| 10,620,165 B2* | 4/2020 | Tumpold | ............. | G01N 29/2425 |
| 10,746,655 B2* | 8/2020 | Liu | ............. | G01N 21/39 |
| 10,782,270 B2* | 9/2020 | Theuss | ............. | G01N 29/032 |
| 2016/0313288 A1 | 10/2016 | Theuss et al. | | |
| 2019/0113443 A1* | 4/2019 | Gidon | ............. | G01N 21/1702 |
| 2019/0195834 A1* | 6/2019 | Eberl | ............. | G01J 1/1626 |
| 2019/0376889 A1* | 12/2019 | Takei | ............. | G01N 21/00 |

* cited by examiner

*Primary Examiner* — Tran M. Tran
(74) *Attorney, Agent, or Firm* — Harrity & Harrity, LLP

(57) ABSTRACT

A photo-acoustic gas sensor may include a detector component. The detector component includes a package that defines a reference volume. The reference volume houses a reference gas. The detector component includes a pressure sensing element to measure an amount of pressure in the reference volume. The amount of pressure in the reference volume depends on absorption of a wavelength of light by the reference gas in the reference volume. A sensitivity of the pressure sensing element when measuring the amount of pressure in the reference volume depends on a length of a reference path associated with the reference volume. The detector component includes a reference path structure that causes the length of the reference path to be less than or equal to 0.5 millimeters.

20 Claims, 13 Drawing Sheets

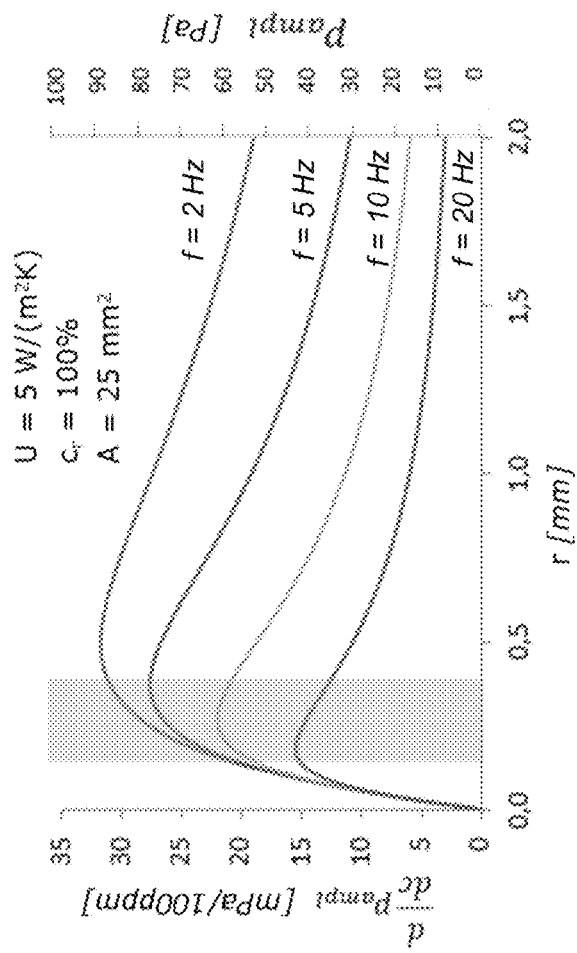
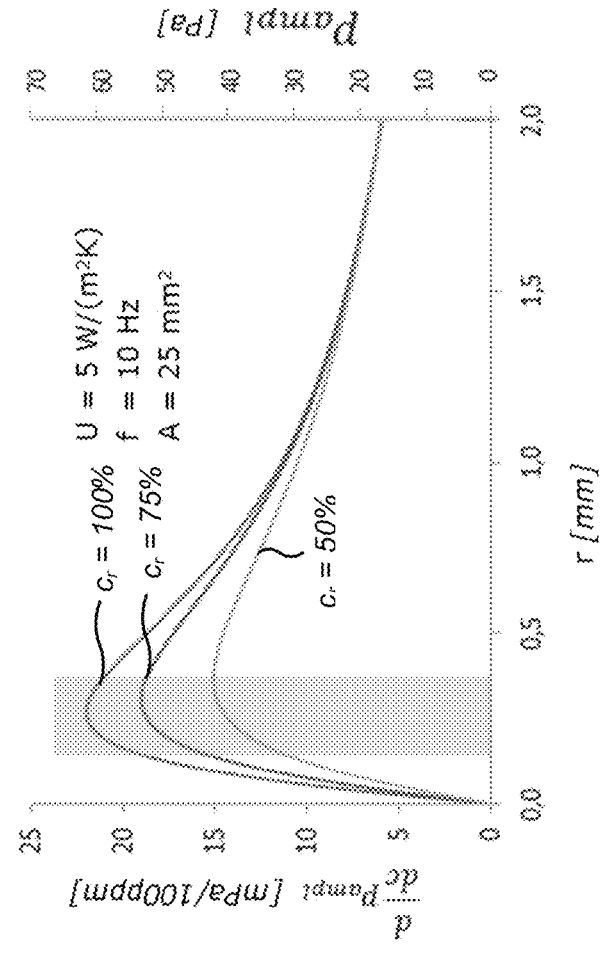
FIG. 1A
FIG. 1B

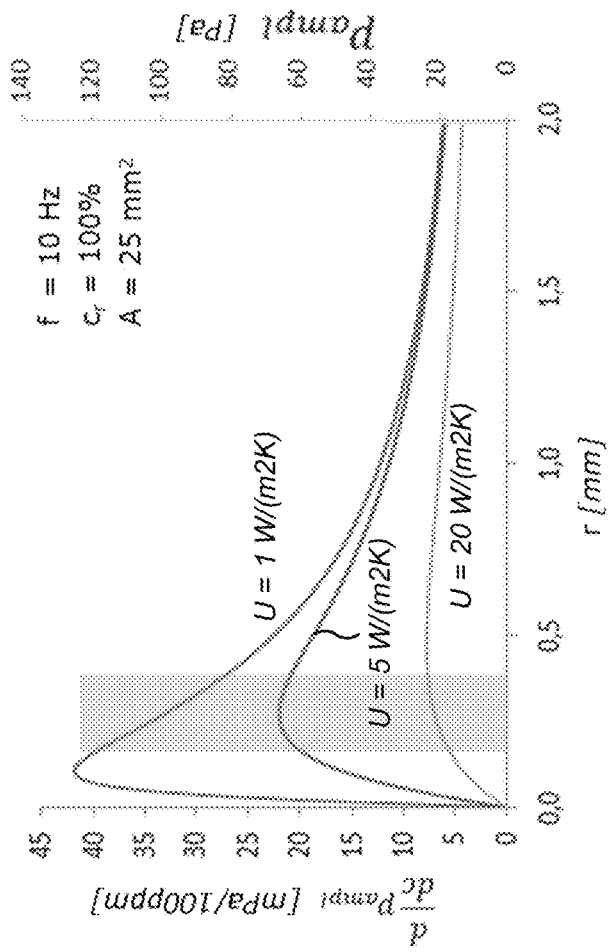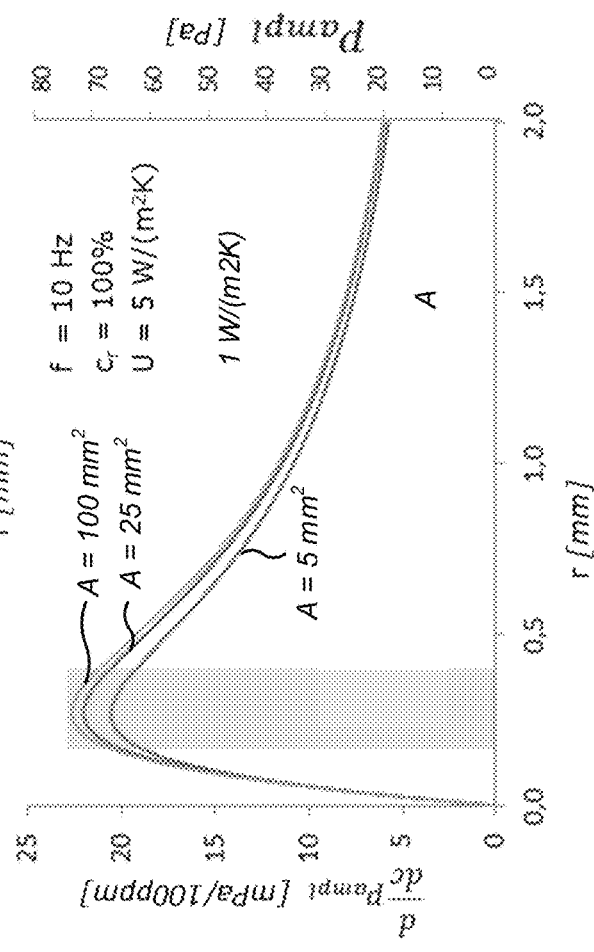
FIG. 1C
FIG. 1D

PHOTO-ACOUSTIC GAS SENSOR WITH OPTIMAL REFERENCE PATH LENGTH

BACKGROUND

A photo-acoustic gas sensor is a sensor that measures a concentration of a gas in an area around or near the photo-acoustic gas sensor. In operation, the photo-acoustic gas sensor measures the gas concentration based on light absorption (e.g., infrared (IR) absorption). For example, a photo-acoustic gas sensor typically includes an emitter to emit light and a detector to receive the light after propagation of the light on an absorption path (e.g., an optical path between the emitter and the detector). Typically, the emitted light includes light having a wavelength in an absorption band of the gas (e.g., a range of wavelengths known to be absorbed by the gas). Here, an amount of light that is absorbed on the absorption path can be translated to a measurement of the gas concentration.

In order to determine the amount of absorption, the detector includes a pressure sensing element (e.g., a micro-electro-mechanical systems (MEMS) microphone) within a reference volume (e.g., a hermetic volume) that houses a reference gas (e.g., the gas of interest in a relatively high concentration). In operation, a portion of light is absorbed by the gas (if any) along the absorption path, and a portion of the remaining unabsorbed light is absorbed by the reference gas. The reference gas absorbs light in the absorption band and, thus, operates as a selective filter: only a spectral section related to the reference gas in the reference volume is absorbed in the detector. Here, the volume of the reference volume is fixed and, as a result, energy of the light absorbed by the reference gas transfers into a temperature increase. This temperature increase causes a pressure change in the reference volume (since pressure is directly proportional to temperature/volume ($p \propto T/V$)). The pressure change is detected by the pressure sensing element in the reference volume. An amount of absorption in the reference volume can therefore be identified based on an output of the pressure sensing element. It follows that absorption on the absorption path can be identified based on the pressure change in the reference volume, which can be translated into a concentration of the gas along the absorption path.

SUMMARY

According to some possible implementations, a photo-acoustic gas sensor includes a detector component, the detector component including: a package that defines a reference volume, the reference volume housing a reference gas; a pressure sensing element to measure an amount of pressure in the reference volume, the amount of pressure in the reference volume depending on absorption of a wavelength of light by the reference gas in the reference volume, wherein a sensitivity of the pressure sensing element when measuring the amount of pressure in the reference volume depends on a length of a reference path associated with the reference volume; and a reference path structure that causes the length of the reference path to be less than or equal to 0.5 millimeters.

According to some implementations, a gas sensor comprises: an emitter component including an emitter to emit light at a particular wavelength; and a detector component including: a pressure sensing element to measure an amount of pressure in a reference volume of the detector component, the reference volume housing a reference gas, wherein the amount of pressure in the reference volume is defined by absorption of the light by the reference gas, and wherein a sensitivity of the pressure sensing element depends on a length of a reference path associated with the reference volume; and a reference path structure that results in the length of the reference path being less than or equal to 0.5 millimeters.

According to some implementations, a detector component of a gas sensor includes: a package that defines a reference volume, wherein a reference gas is present in the reference volume; a pressure sensing element to measure an amount of pressure in the reference volume, wherein the amount of pressure in the reference volume depends on absorption of a wavelength of light by the reference gas in the reference volume; and a reference path structure that causes a reference path, associated with the reference volume, to have a length that is less than or equal to 0.5 millimeters, wherein the length of the reference path causes a sensitivity of the pressure sensing element to be in a range from 10 millipascals per 100 parts per million (mPa/100 ppm) to 40 mPa/100 ppm.

BRIEF DESCRIPTION OF THE DRAWINGS

FIGS. 1A-1D are diagrams illustrating example simulations of sensitivities of detector components for reference paths having lengths across a particular range.

DETAILED DESCRIPTION

Figure 2:
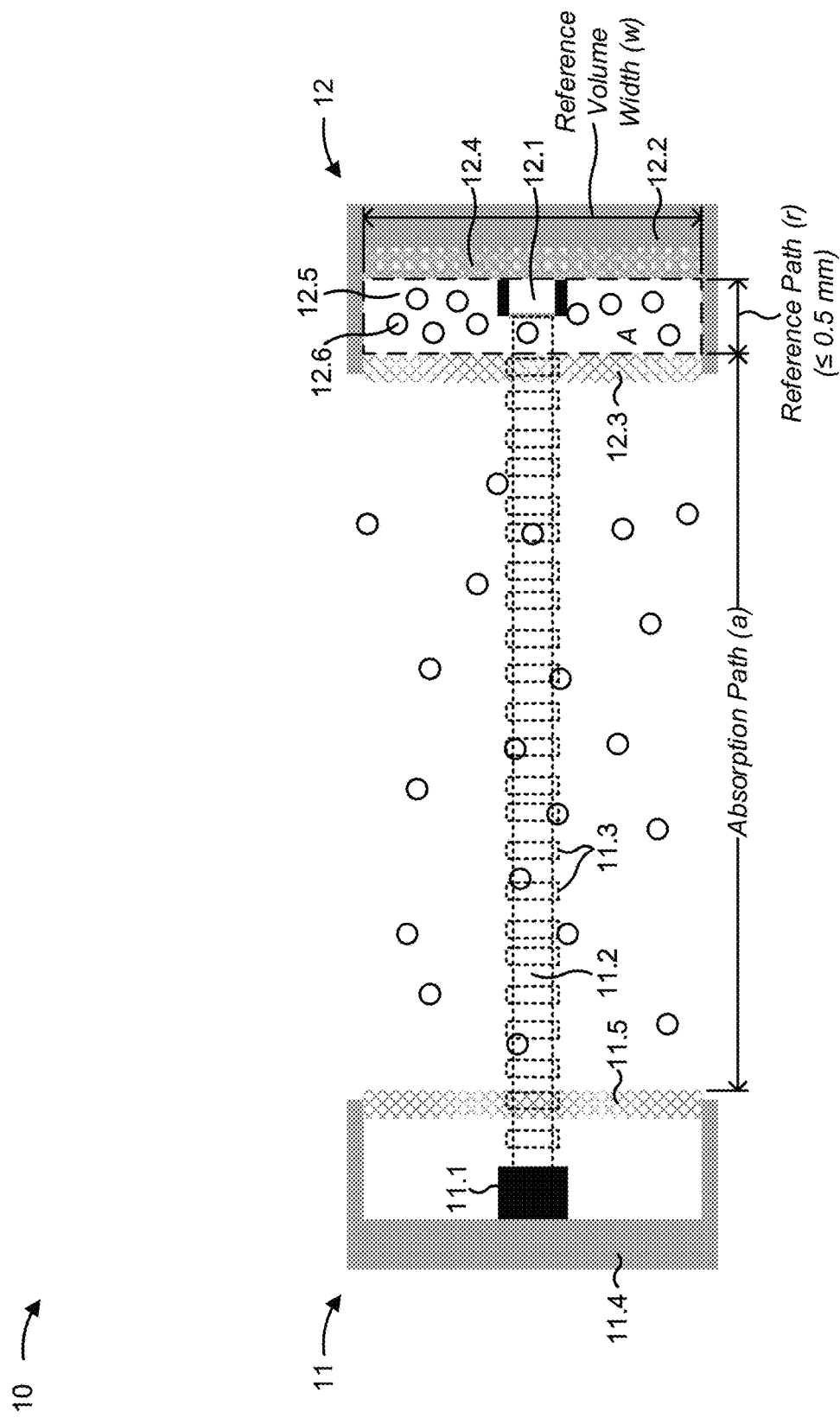
FIG. 2 is a diagram illustrating an example photo-acoustic gas sensor in which an improved detector component, described herein, may be implemented.

The following detailed description of example implementations refers to the accompanying drawings. The same reference numbers in different drawings may identify the same or similar elements.

As described above, a photo-acoustic gas sensor may be capable of measuring a concentration of a gas of interest based on pressure in a reference volume that houses a reference gas (i.e., a relatively high concentration of the gas of interest). In a given application, the photo-acoustic gas sensor may need to be sensitive enough to detect a relatively small change in pressure. As an example, in a carbon dioxide ($CO_2$) sensing application, a concentration of $CO_2$ may be expected to range from 0 parts per million (ppm) to 10,000 ppm, and detection of a change of 100 ppm may be desirable. In such a case, in order to detect a 100 ppm change in the identified range, the sensitivity of the photo-acoustic gas sensor should be at least 10 millipascals (mPa). In other words, the photo-acoustic gas sensor should be sensitive enough to detect a change in pressure in the reference volume of at least 10 mPa.

In practice, the sensitivity of the photo-acoustic gas sensor depends on a length of a reference path in the detector component of the photo-acoustic gas sensor. The reference path is a path on which incident light (e.g., light that is not absorbed on the absorption path) is absorbed by the reference gas within the reference volume. Here, the length of the reference path is defined by a length from a light inlet window of the detector component (e.g., an optical component that allows the incident light to propagate into the reference volume) to an interior surface of the reference volume (e.g., a surface of the reference volume that defines a portion of the reference volume in which the incident light can be absorbed) in a direction of propagation of the incident light. The interior surface of the reference volume can include one or more surfaces such that the reference path length varies across the detector component. For example, the interior surface can include a surface of the pressure sensing element, a surface of an electrical component mounted in the reference volume, a surface of a semiconductor layer, a surface of a bond pad, and/or a surface of another feature. Therefore, the length of the reference path may be taken as an average of lengths between the light inlet window and the interior surface across the reference volume of the detector component.

In a photo-acoustic gas sensor, the detector component and the emitter component are typically mounted in a metallic package (e.g., a TO can package) or a ceramic package. Here, the length of the reference path is governed by the applicable package technology. In a metallic package, the length of the reference path is conventionally in a range from 2 mm to 10 mm. In a ceramic package, the length of the reference path is conventionally in a range from 1 mm to 2 mm. Notably, these conventional reference path lengths are a product of the package technology, and are not designed or selected in consideration of sensitivity of the photo-acoustic gas sensor.

However, in order to improve the sensitivity of the detector component, it may be desirable to design the detector component such that the reference path has a length that is less than or equal to 0.5 mm. FIGS. 1A-1D are diagrams illustrating example simulations of sensitivities of detector components with reference paths having lengths across a particular range. FIGS. 1A-1D illustrate that, regardless of other characteristics of a detector component and/or light incident thereon, a detector component with a reference path having a length that is less than or equal to 0.5 mm improves the sensitivity of the detector component (e.g., as compared to a conventional detector component).

FIG. 1A is a diagram illustrating a simulation of sensitivity of a detector component for a range of reference path lengths r from 0 mm to 2 mm for different frequencies f of light pulses in the incident light. In FIG. 1A, a heat energy transfer rate U of the detector component (e.g., a rate of heat flow in watts (W) through an area of 1 square meter ($m^2$) for a temperature difference of 1 degree Kelvin (K)) is 5 $W/m^2K$, a concentration $c_r$ of the reference gas is 100%, and a reference area A (e.g., an area equal to the length of the reference path r times a width of the reference volume) is 25 square millimeters ($mm^2$). As shown, for frequencies f of 2 Hz, 5 Hz, 10 Hz, and 20 Hz, the sensitivity of the detector component (d/dc p_(ampl), measured in mPa/100 ppm) is maximized when the reference path length r is less than 0.5 mm. In FIG. 1A, the shaded section corresponds to lengths of r from 0.2 mm to 0.4 mm. Thus, FIG. 1A illustrates that, for different frequencies of light pulses, a reference path with a length r that is less than or equal to 0.5 mm is desirable.

FIG. 1B is a diagram illustrating a simulation of sensitivity of a detector component for a range of reference path lengths r from 0 mm to 2 mm for different concentrations $c_r$ of the reference gas. In FIG. 1B, the heat energy transfer rate U of detector component 12 is 5 $W/m^2K$, the frequency f of the light pulses is 10 Hz, and the reference area A is 25 $mm^2$. As shown, for concentrations $c_r$ of 100%, 75%, 50%, the sensitivity of the detector component is maximized when r is less than 0.5 mm. In FIG. 1B, the shaded section corresponds to lengths of r from 0.2 mm to 0.4 mm. Thus, FIG. 1B illustrates that, for different concentrations of the reference gas, a reference path with a length r that is less than or equal to 0.5 mm is desirable.

FIG. 1C is a diagram illustrating a simulation of sensitivity of the detector component for a range of reference path lengths r from 0 mm to 2 mm for different heat energy transfer rates U of detector component 12. In FIG. 1C, the frequency f of the light pulses is 10 Hz, the concentration $c_r$ of the reference gas is 100%, and the reference area A is 25 $mm^2$. As shown, for heat transfer rates U of 1 $W/m^2K$, 5 $W/m^2K$, and 20 $W/m^2K$, the sensitivity of the detector component is maximized when r is less than 0.5 mm. In FIG. 1C, the shaded section corresponds to lengths of r from 0.2 mm to 0.4 mm. Thus, FIG. 1C illustrates that, for different heat transfer rates of the detector component, a reference path with a length r that is less than or equal to 0.5 mm is desirable.

FIG. 1D is a diagram illustrating a simulation of sensitivity of the detector component for a range of reference path lengths r from 0 mm to 2 mm for different reference areas A. In FIG. 1D, the frequency f of the light pulses is 10 Hz, the concentration $c_r$ of the reference gas is 100%, and the heat transfer rate is 5 $W/m^2K$. As shown, for reference areas A of 5 $mm^2$, 25 $mm^2$, and 100 $mm^2$, the sensitivity of the detector component is maximized when r is less than 0.5 mm. In FIG. 1D, the shaded section corresponds to lengths of r from 0.2 mm to 0.4 mm. Thus, FIG. 1D illustrates that, for different reference areas of the reference volume, a reference path with a length r that is less than or equal to 0.5 mm is desirable.

As indicated above, FIGS. 1A-1D are provided merely as examples for illustrative purposes. Other examples may differ from what is described with regard to FIGS. 1A-1D.

As indicated above, FIGS. 1A-1D illustrate that, regardless of other characteristics of a detector component and/or light incident thereon, a detector component with a reference path having a length that is less than or equal to 0.5 mm improves the sensitivity of the detector component (e.g., as compared to a conventional detector component). However, as described a above, conventional reference path lengths are typically greater than 1 mm and result from a package technology of the detector component (rather than being designed). Therefore, an improved detector component (e.g., a detector component with a reference path having a length of less than 0.5 mm) is needed in order to improve sensitivity of the photo-acoustic gas sensor.

Some implementations described herein provide a photo-acoustic gas sensor comprising an improved detector component that includes a reference path structure which causes a length of a reference path to be less than or equal to 0.5 mm. As described herein, a reference path with a length that is less than 0.5 mm improves sensitivity of a pressure sensing element included in the improved detector component, thereby allowing relatively small changes in pressure (e.g., a change of 10 mPa) to be detected. In this way, the improved detector component allows performance of the photo-acoustic gas sensor to be improved (e.g., as compared to a photo-acoustic gas sensor including a conventional detector component in which the reference path length is greater than 0.5 mm, as described above). Various techniques can be applied in order to provide the reference structure that causes a reference path to have a length r that is less than or equal to 0.5 mm, examples of which are provided below.

FIG. 2 is a diagram illustrating an example photo-acoustic gas sensor 10 in which an improved detector component (herein referred to as detector component 12), described herein, may be implemented. As shown in FIG. 2, photo-acoustic gas sensor 10 may include an emitter component 11 and a detector component 12.

As shown, emitter component 11 may include an emitter 11.1 configured to emit light 11.2 including light pulses 11.3 with a particular repetition frequency and a wavelength corresponding to an absorption band of a gas to be sensed. For example, emitter 11.1 can include a broad-band emitter, a narrow-band emitter, a coherent light emitter, a non-coherent light emitter, a blackbody radiator, a lamp, a heated resistor, a light emitting diode (LED), a laser diode, and/or the like. In the case of a broad-band emitter, emitter component 11 may include an optical filter configured to allow light of a pre-selected or tunable wavelength to pass through. In some implementations, light 11.2 emitted by emitter 11.1 may include any desired wavelength (e.g., an IR wavelength) or wavelength range (e.g., in the visible or non-visible spectrum). For example, emitter 11.1 may be configured to emit light 11.2 of a pre-selected wavelength that corresponds to the absorption band of the gas to be sensed. In some implementations, emitter 11.1 may be tunable such that the wavelength of light 11.2 can be selected and/or controlled. In some implementations, the repetition frequency of light pulses 11.3 can be, for example, in an audio frequency range, in a frequency range from 1 Hz to 10 kilohertz (kHz), such as 50 Hz.

As further shown, emitter component 11 includes a housing 11.4. In some implementations, housing 11.4 can include, for example, a ceramic package, a metallic package (e.g., a TO can package) and/or the like. As further shown, emitter component 11 includes a light outlet window 11.5, which is an optical window via which light 11.2 can be transmitted. As shown, emitter component 11 may be arranged such that light 11.2 transmitted via light outlet window 11.5 propagates on an absorption path with length a in a direction toward detector component 12.

As further shown in FIG. 2, detector component 12 of photo-acoustic gas sensor 10 includes a pressure sensing element 12.1, a housing 12.2, a light inlet window 12.3, and a reference path structure 12.4. As shown, housing 12.2, light inlet window 12.3, and reference path structure 12.4 define a reference volume 12.5 that houses a reference gas 12.6 (e.g., a relatively high concentration of the gas to be sensed). As indicated in FIG. 2, reference volume 12.5 may have a reference path with length r and a reference volume width w. The reference path length r and the reference volume width w define a reference volume area A. As described above, the length r of the reference path may be taken as an average of lengths r between light inlet window 12.3 and an interior surface across reference volume 12.5 as defined by features of detector component 12 (e.g., pressure sensing element 12.1 and/or one or more of the components or features). In some implementations, detector component 12 may include one or more other components (not shown in FIG. 2), one or more of which may partially define reference volume 12.5. Such other components include, for example, a logic integrated circuit, an application specific integrated circuit (ASIC), a bond pad, a wirebond, and/or the like. In some implementations, reference gas 12.6 may be hermetically sealed in reference volume 12.5.

Pressure sensing element 12.1 includes a component capable of sensing a pressure in reference volume 12.5, and providing an output signal that represents the pressure in reference volume 12.5. For example, pressure sensing element 12.1 can include a microphone, a MEMS microphone, and/or another type of pressure sensing component.

In some implementations, housing 12.2 can include, for example, a ceramic package, a metallic package, and/or the like. In some implementations, light inlet window 12.3 includes an optical window via which an unabsorbed portion of light 11.2 can be transmitted (e.g., such that the unabsorbed portion of light 11.2 can propagate to reference volume 12.5).

Reference path structure 12.4 includes a structure that causes the length r of the reference path to be less than or equal to 0.5 mm. Reference path structure 12.4 can include, for example, a fill material that at least partially defines reference volume 12.5, a pedestal layer within reference volume 12.5, a lid structure within reference volume 12.5, a recessed lid that at least partially defines reference volume 12.5, or a structure of housing 12.2 that at least partially defines reference volume 12.5 (e.g., such that the length r of the reference path is less than 0.5 mm). Various embodiments of reference path structure 12.4 are described below.

In photo-acoustic gas sensor 10, emitter component 11 is arranged so that light 11.2 propagates on the absorption path (e.g., in an area designed to accommodate the gas of interest), and detector component 12 is arranged so that pressure sensing element 12.1 can receive a signal oscillating with the repetition frequency. In operation, as described above, light 11.2 modulated with the repetition frequency is absorbed by the gas along the absorption path and generates a local pressure in reference volume 12.5 which produces a characteristic signal at pressure sensing element 12.1. As described above, the absorption of light 11.2 along the absorption path is specific for the gas, and the concentration of the gas can be determined based on an output signal of pressure sensing element 12.1.

The measurement principle is thus configured in such a way that in a case where no gas is present along the absorption path (e.g., an optical path between emitter component 11 and light inlet window 12.3 of detector component 12), light pulses 11.3 enter reference volume 12.5 without any attenuation, so that a signal provided by pressure sensing element 12.1 will be maximized. Conversely, if the gas is present along absorption path a, light pulses 11.3 will be attenuated so that light pulses of comparatively lower intensity will enter reference volume 12.5, thereby resulting in a decrease of the signal provided by pressure sensing element 12.1. Hence, the signal oscillating with the repetition frequency and detected by pressure sensing element 12.1 emanates from reference gas 12.6. The presence of the gas along the absorption path is indicated by a decrease of the signal strength detected by pressure sensing element 12.1. In some implementations, the gas to be sensed may include, for example, $CO_2$, nitrogen oxide ($NO_X$), water ($H_2O$), oxygen ($O_2$), nitrogen ($N_2$), methane ($CH_4$), alcohol, and/or the like.

The number and arrangement of components shown in photo-acoustic gas sensor 10 are provided as examples. In practice, photo-acoustic gas sensor 10 may include additional components and/or elements, fewer components and/or elements, different components and/or elements, or differently arranged components and/or elements than those shown in FIG. 2. Additionally, or alternatively, a set of components (e.g., one or more components) or a set of elements (e.g., one or more elements) of photo-acoustic gas sensor 10 may perform one or more functions described as being performed by another set of components or another set of elements of photo-acoustic gas sensor 10.

FIGS. 3-4, 5A-5B, 6A-6B, 7A-7C, and 8 are diagrams illustrating various example implementations of reference path structure 12.4 that cause detector component 12 to have a reference path with a length r that is less than 0.5 mm. In FIGS. 3-4, 5A-5B, 6A-6B, 7A-7C, and 8, additional details of one or more components are illustrated (e.g., layers of housing 12.2, metallic layers between layers of housing 12.2, vias in layers of housing 12.2, bond pads, wirebonds, and the like). However, these additional details are provided merely for illustrative purposes and are not intended to impart structural limitations, structural guidelines, or actual electrical connections of detector component 12.

Figure 3:
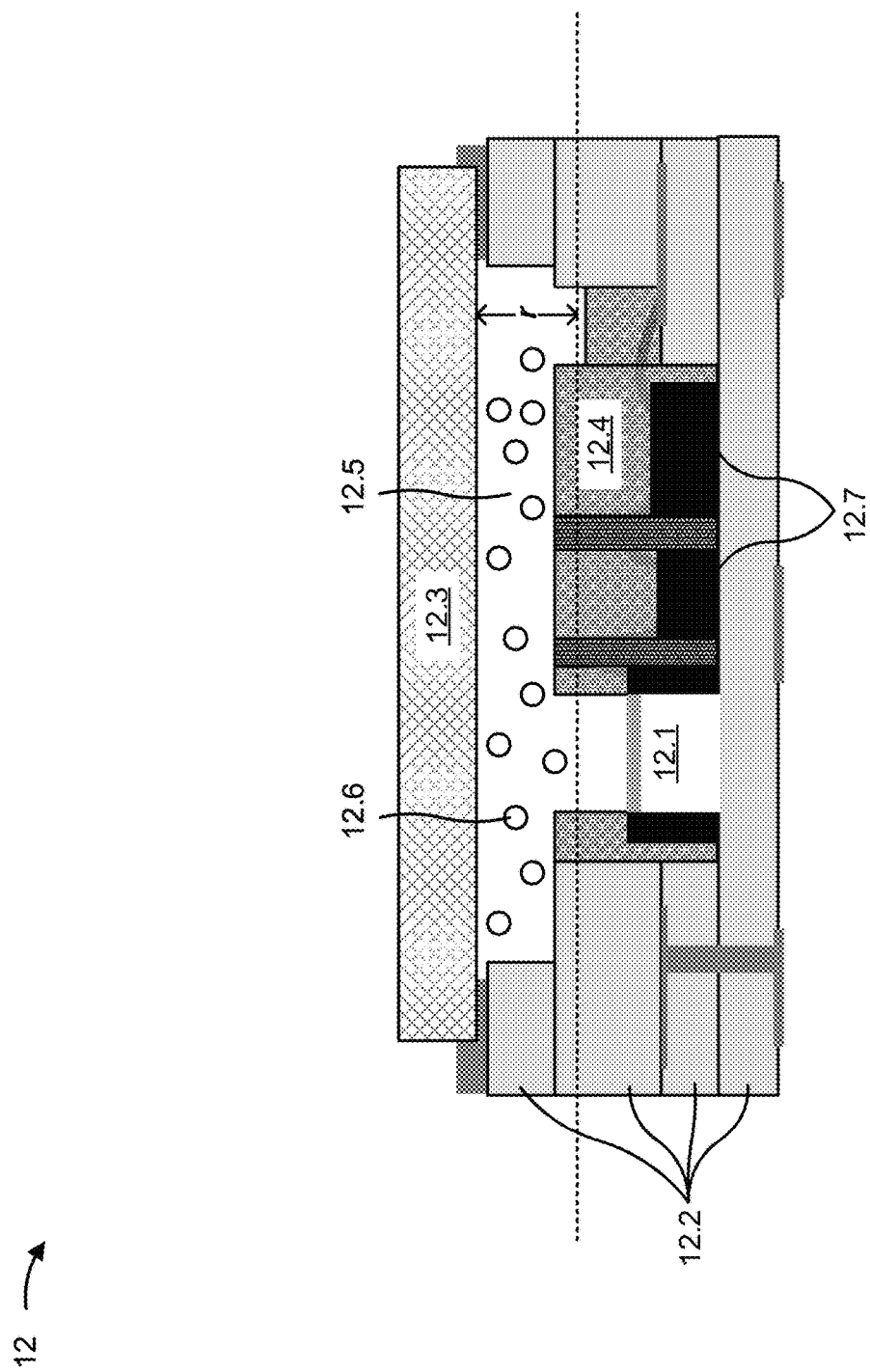
FIGS. 3-4, 5A-5B, 6A-6B, 7A-7C, and 8 are diagrams illustrating various example implementations of a reference path structure that causes an improved detector component to have a reference path with a length that is less than or equal to 0.5 mm, as described herein.

FIG. 3 is a diagram of a cross section of a detector component 12 in which reference path structure 12.4 includes a fill material that at least partially defines reference volume 12.5. The fill material may include, for example, an epoxy, a polymer, a block of semiconductor material, and/or another type of material.

In some implementations, the fill material may be deposited, formed, placed, or otherwise arranged in detector component 12 in order to cause the length r of the reference path to be less than 0.5 mm. For example, as shown in FIG. 3, the fill material may be deposited between, around, and/or over components of detector component 12 such that the length r is less than 0.5 mm. In other words, the fill material may be deposited between, around, and/or over components of detector component 12 (e.g., pressure sensing element 12.1, one or more other components 12.7, such as a logic circuit, an ASIC, a wirebond, and/or the like) such that the average length between light inlet window 12.3 and an interior surface of reference volume 15 that is defined by pressure sensing element 12.1 and/or the one or more other components 12.7 of detector component 12 is less than 0.5 mm.

Notably, as shown in FIG. 3, the fill material should not be deposited, formed, or otherwise arranged over a membrane of pressure sensing element 12.1 (e.g., in order to prevent an impact on performance of pressure sensing element 12.1). In some implementations, the fill material may include conductive metal layers and/or via holes that allow electrical signals to propagate through detector component 12.

Figure 4:
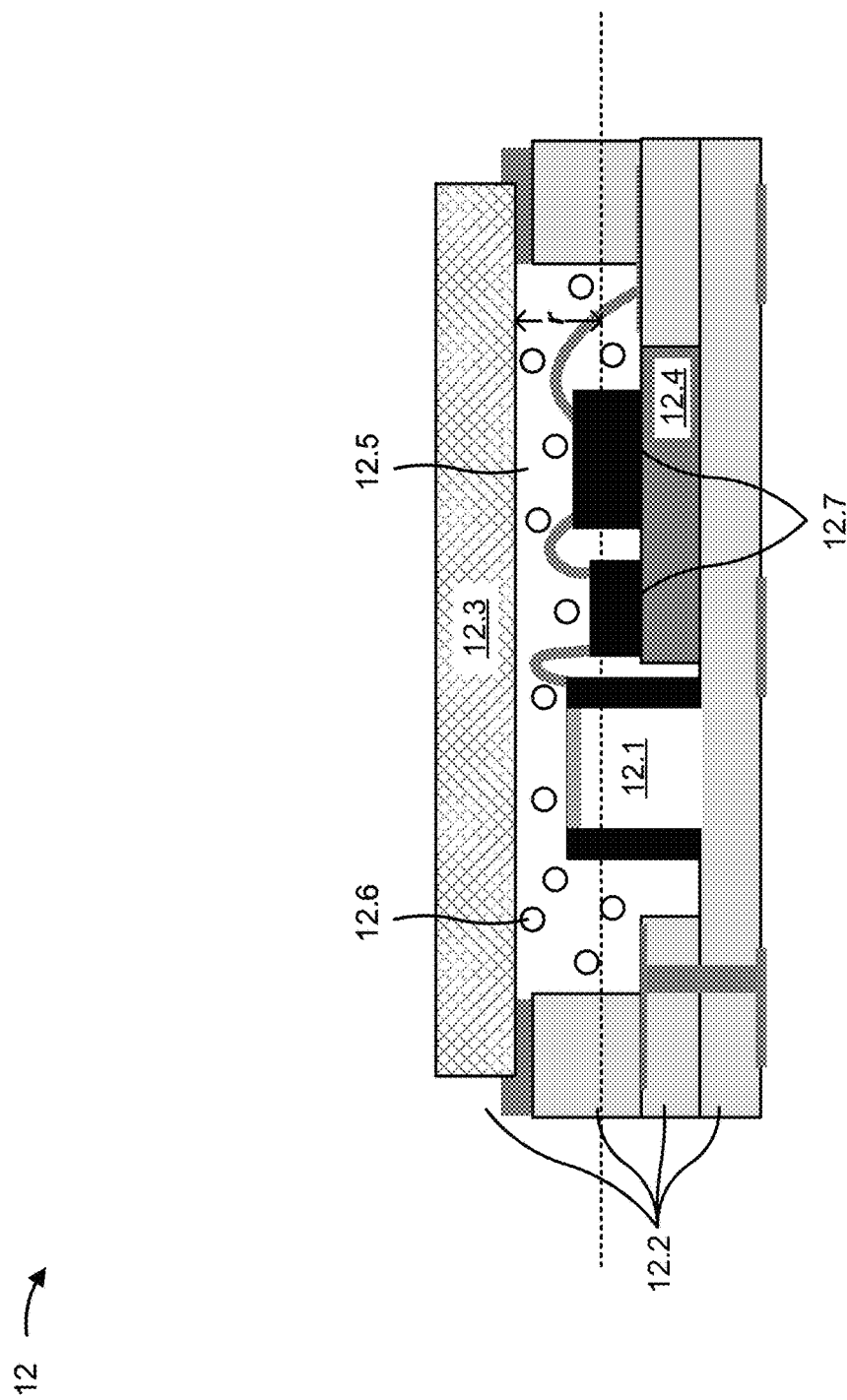

FIG. 4 is a diagram of a cross section of a detector component 12 in which reference path structure 12.4 includes a pedestal layer within reference volume 12.5. The pedestal layer may include, for example, a layer formed from a ceramic material, a semiconductor material, and/or the like.

In some implementations, the pedestal layer material may be deposited, formed, placed, or otherwise arranged in detector component 12 in order to reduce a distance between a component of detector component 12 and light inlet window 12.3 (e.g., as compared to a distance without the pedestal layer), such that the length r of the reference path is less than 0.5 mm. For example, as shown in FIG. 4, the pedestal layer may be formed, and the one or more other components 12.7 of detector component 12 may be arranged on the pedestal layer such that a distance between the one or more other components 12.7 and light inlet window 12.3 is reduced (e.g., as compared to the distance without the pedestal layer). In this way, the pedestal layer may cause the average length between light inlet window 12.3 and the interior surface of reference volume 15 (e.g., the surface that is defined by pressure sensing element 12.1, the one or more other components 12.7, and exposed surfaces of housing 12.2) to be less than 0.5 mm.

FIGS. 5A-5B and 6A-6B are diagrams of cross sections of detector components 12 in which reference path structure 12.4 includes a lid structure within reference volume 12.5.

Figure 5A:
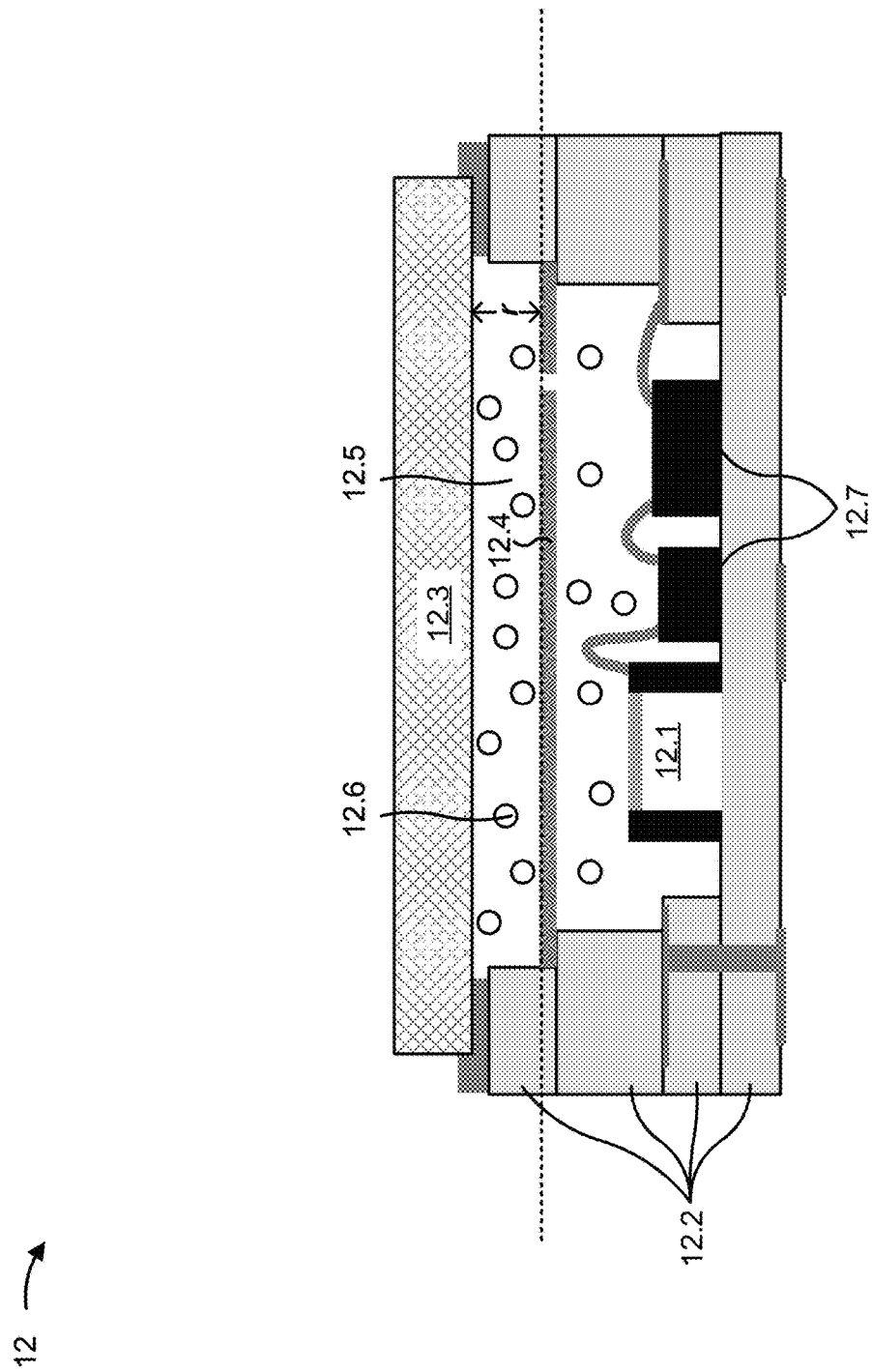
Figure 5B:
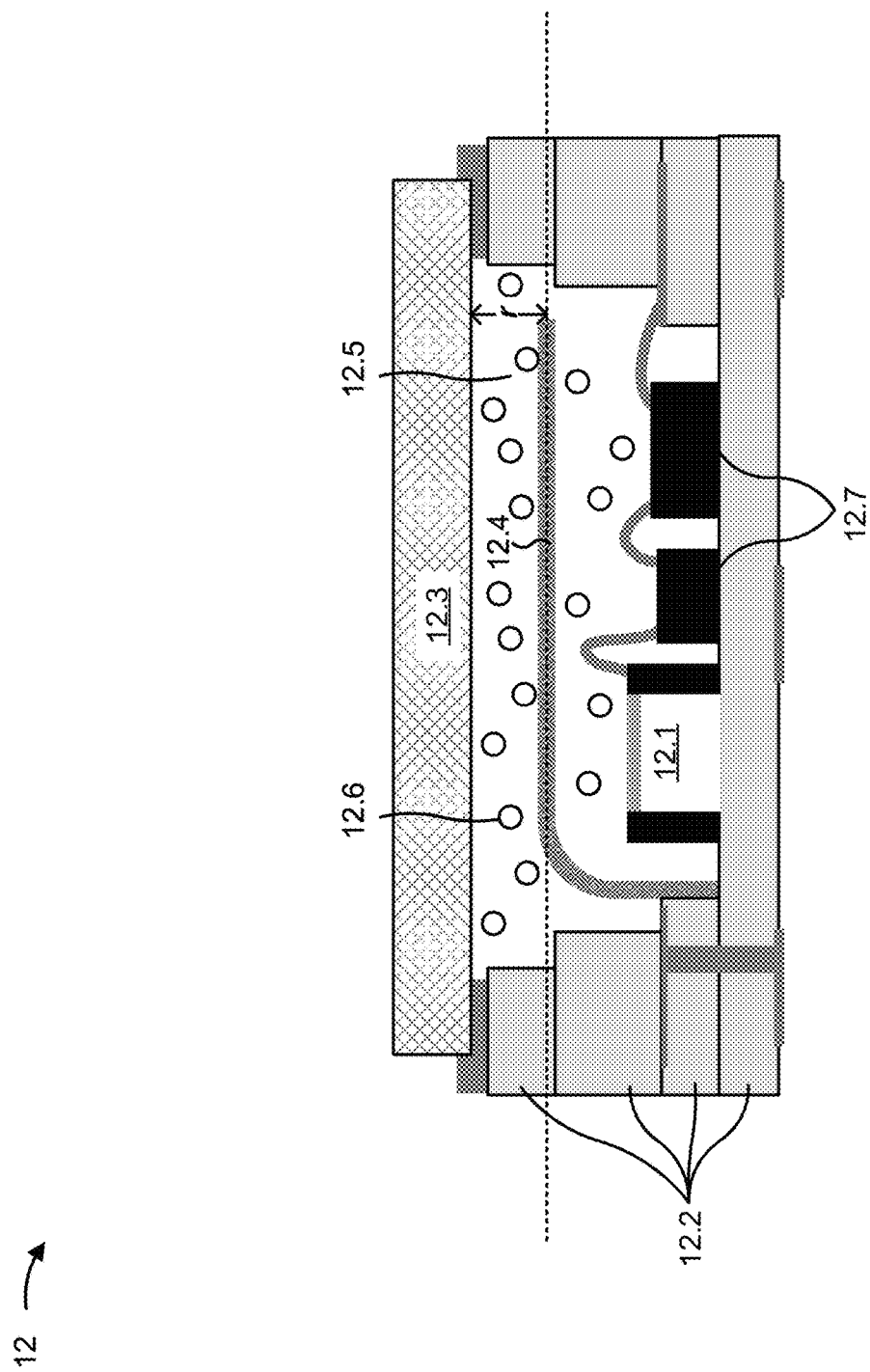
Figure 6A:
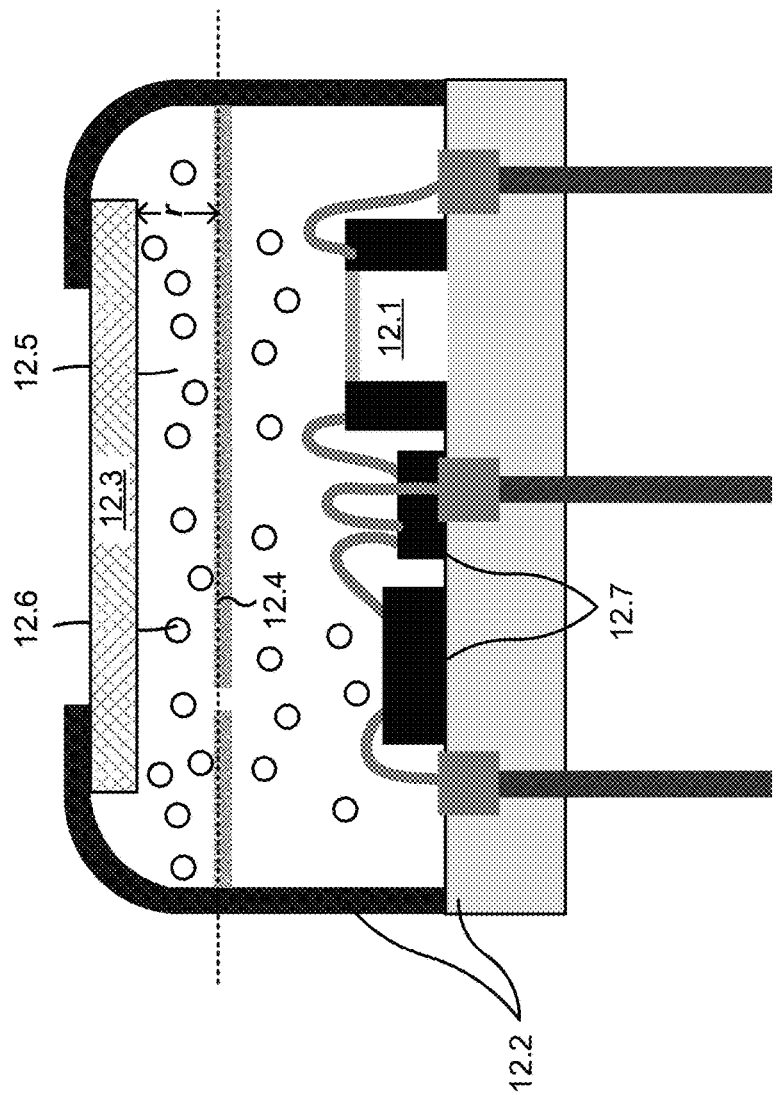
Figure 6B:
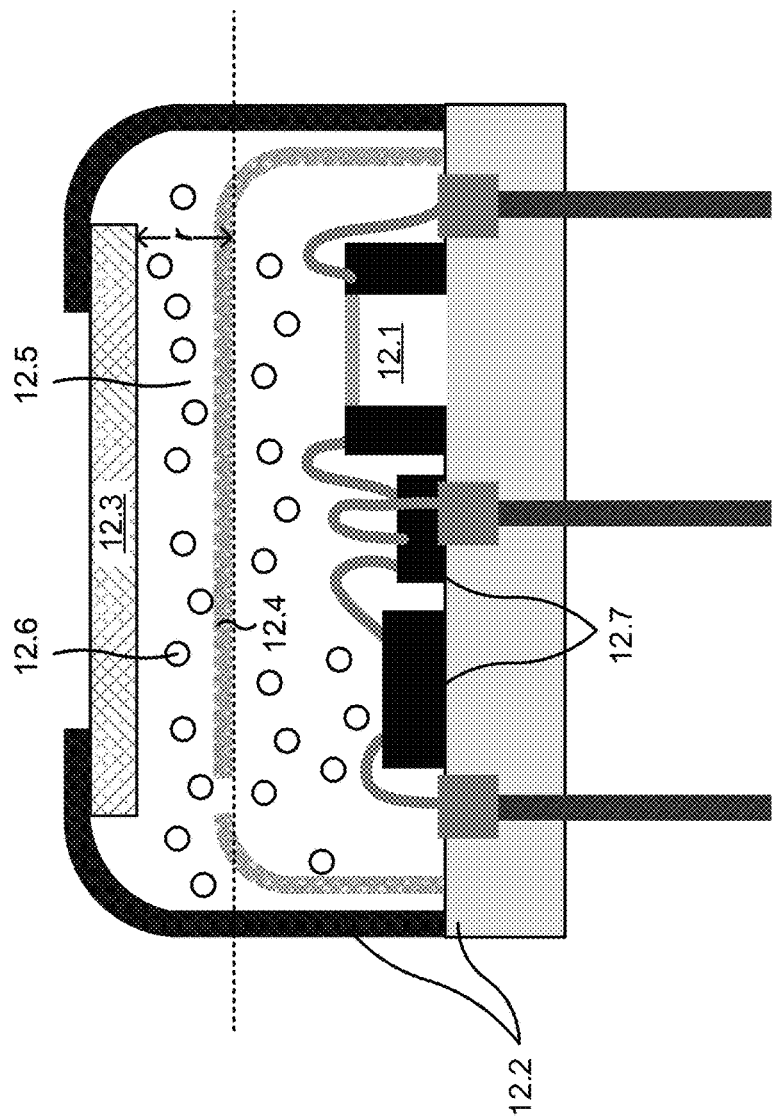

FIGS. 5A and 5B are diagrams of cross sections of ceramic-based detector components 12 in which reference path structure 12.4 includes a lid structure, and FIGS. 6A and 6B are diagrams of cross sections of metallic-based detector components 12 in which reference path structure 12.4 includes a lid structure within reference volume 12.5.

In some implementations, the lid structure may be formed, placed, or otherwise arranged in detector component 12 in order cause the length r of the reference path to be less than 0.5 mm. For example, as shown in FIGS. 5A-5B and 6A-6B, the lid structure may be placed such that the average length between light inlet window 12.3 and the interior surface of reference volume 15 (e.g., the surface that is primarily defined by the lid structure) is less than 0.5 mm. Notably, in the case of the lid structure, most of the absorption of light 11.2 occurs between the lid structure and light inlet window 12.3 (i.e., absorption below the lid structure is negligible). In other words, in the case of the lid structure, reference volume 12.5 does not extend significantly below the lid structure.

In some implementations, the lid structure may be formed from a metallic material such as kovar. In some implementations, the lid structure is arranged between pressure sensing element 12.1 and light inlet window 12.3. For example, the lid structure may comprise a flat plate that is placed within detector component 12 (e.g., such that the lid structure is on a surface of housing 12.2 or is embedded in a side wall of housing 12.2, as shown in FIGS. 5A and 6A, respectively). As another example, the lid structure may comprise a bent plate that extends from a base of housing 12.2 and is bent within detector component 12 (e.g., such that portion of the lid structure is between pressure sensing element 12.1 and light inlet window 12.3, as shown in FIGS. 5B and 6B).

As shown in FIGS. 5A-5B and 6A-6B, in some implementations, the lid structure may include an opening (e.g., a slot, a hole, and/or the like). The opening in the lid structure is provided in order to allow pressure sensing element 12.1 to measure the amount of pressure in reference volume 12.5, but does not result in significant absorption below the lid structure. In some implementations, a size (e.g., a diameter, a width, and/or the like) of the opening may be less than approximately 1 mm.

Notably, as illustrated in FIGS. 5A-5B and 6A-6B, in some implementations, the lid structure prevents light 11.2 that is transmitted by light inlet window 12.3 from being incident on pressure sensing element 12.1. Thus, in some implementations, the lid structure may act to prevent light 11.2 from being incident on pressure sensing element 12.1, which may prevent damage to pressure sensing element 12.1 that could be caused by incident light and, therefore, prolong an operational lifetime of detector component 12.

Figure 7A:
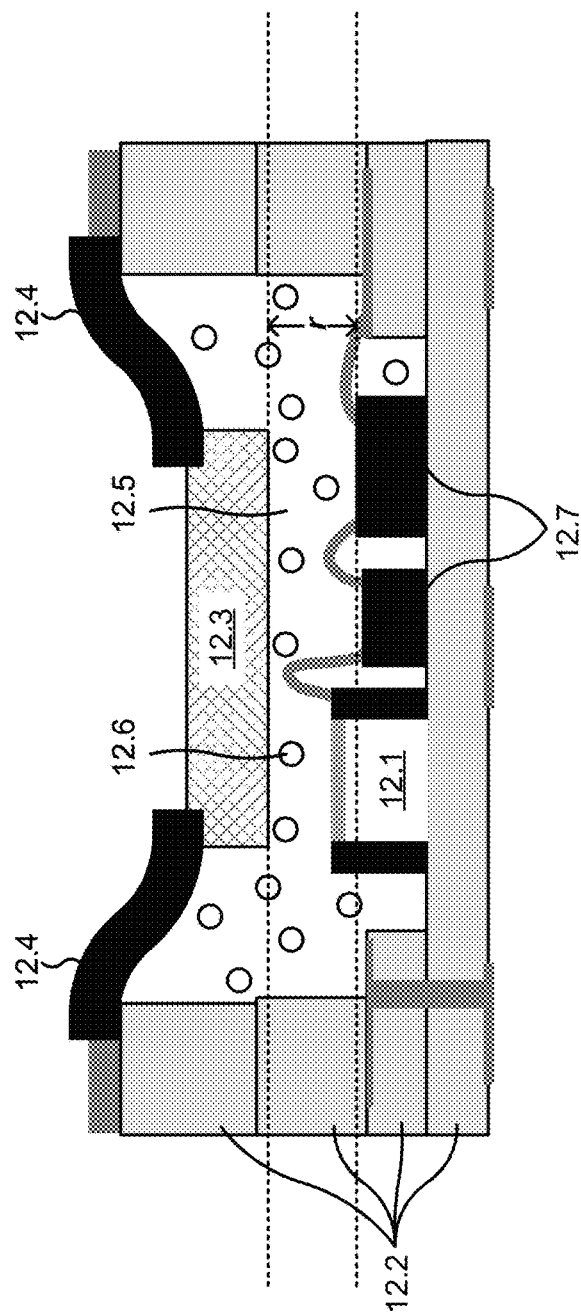
Figure 7B:
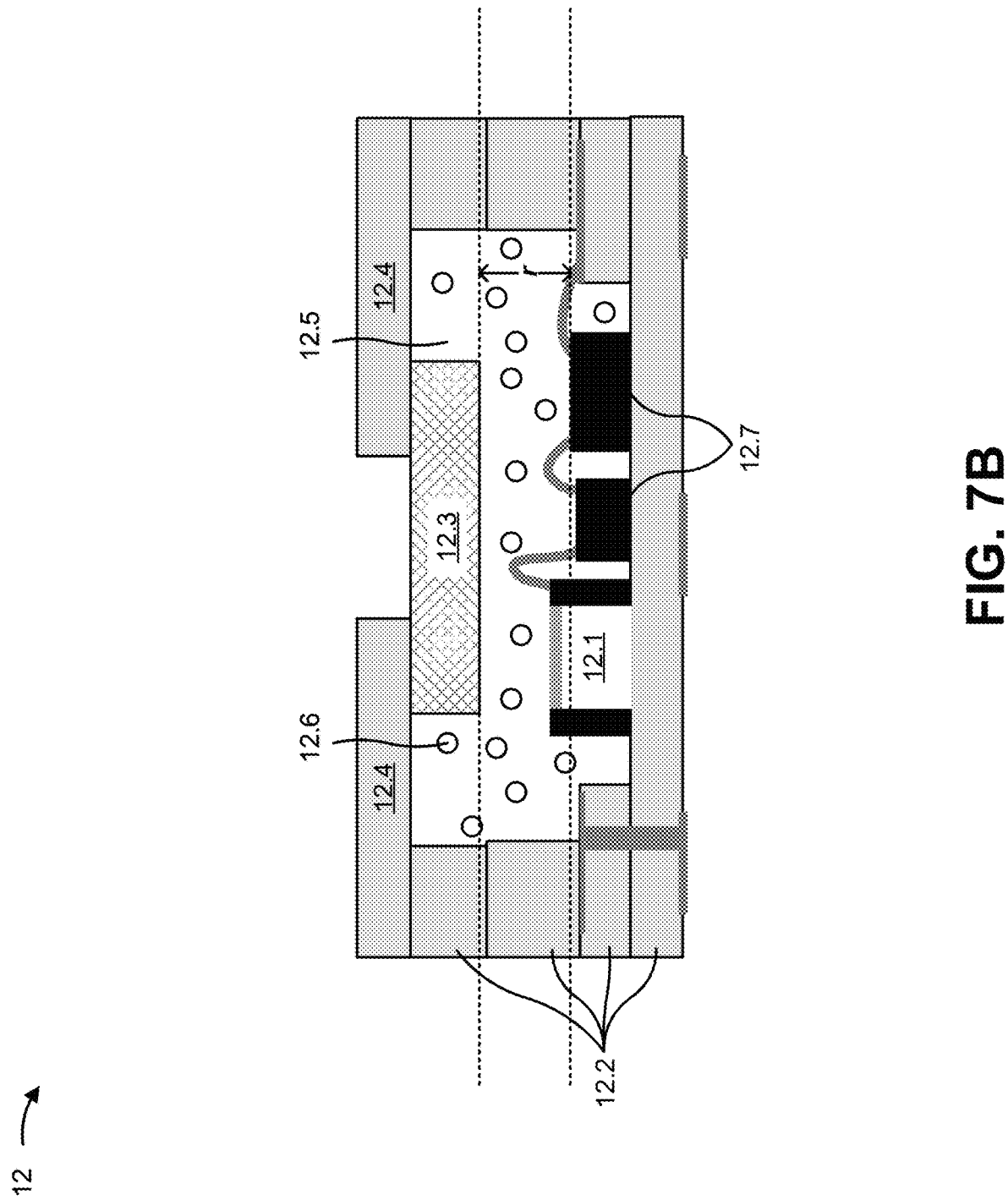
Figure 7C:
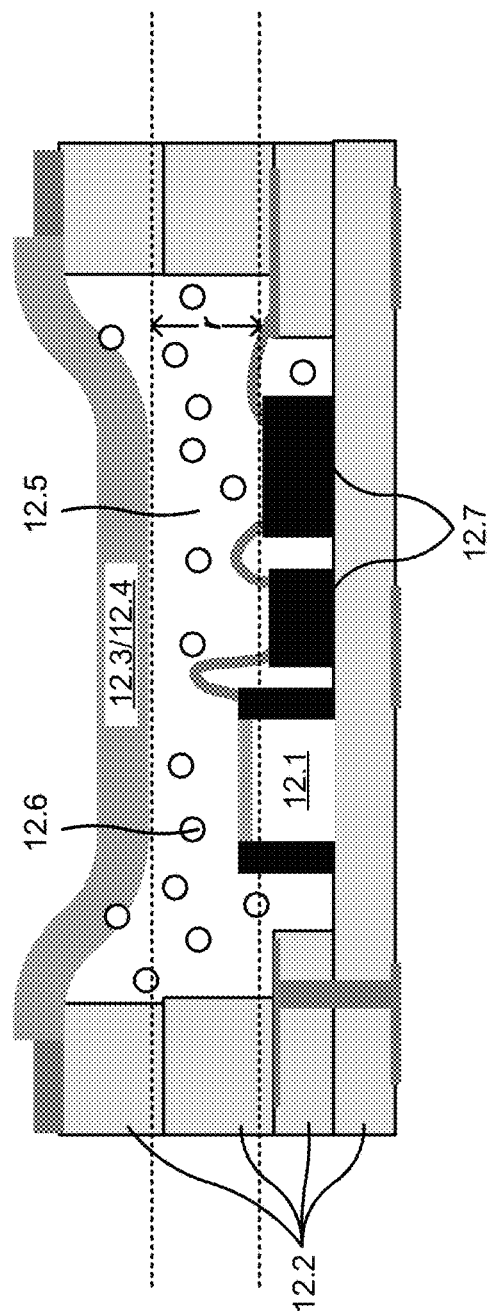

FIGS. 7A-7C are diagrams of cross sections of detector components 12 in which reference path structure 12.4 includes a recessed lid that at least partially defines reference volume 12.5.

In some implementations, the recessed lid may be deposited, formed, placed, or otherwise arranged in order to reduce a distance between a component of detector component 12 and light inlet window 12.3 (e.g., as compared to a distance without a recessed lid), such that the length r of the reference path is less than 0.5 mm. For example, as shown in FIGS. 7A, 7B, and 7C, the recessed lid may be formed such that a distance between light inlet window 12.3 and pressure sensing element 12.1 and/or the one or more other components 12.7 of detector component 12 is reduced (e.g., as compared to the distance without a recessed lid). In this way, the recessed lid may cause the average length between light inlet window 12.3 and the interior surface of reference volume 15 to be less than 0.5 mm.

In some implementations, the recessed lid may include a metallic lid (e.g., formed form kovar) that acts to lower light inlet window 12.3 (e.g., as compared to a position of light inlet window 12.3 when the recessed lid is not used). An example of such a recessed lid is illustrated in FIG. 7A.

In some implementations, the recessed lid may include a lid formed from a ceramic material that acts to lower light inlet window 12.3 (e.g., as compared to a position of light inlet window 12.3 when the recessed lid is not used). An example of such a recessed lid is illustrated in FIG. 7B.

In some implementations, the recessed lid may be integrated with light inlet window 12.3 such that the light inlet window 12.3 is at a lower position (e.g., as compared to a position of light inlet window 12.3 when the recessed lid is not used). An example of such a recessed lid is illustrated in FIG. 7C. In such a case, the recessed lid/light inlet window 12.3 may be formed from a structured glass (e.g., an etched glass wafer), silicon, sapphire, and/or the like. In some implementations, the recessed lid may be coated with an anti-reflective (AR) coating in order to reduce reflection of light 11.2 back toward emitter component 11.

Figure 8:
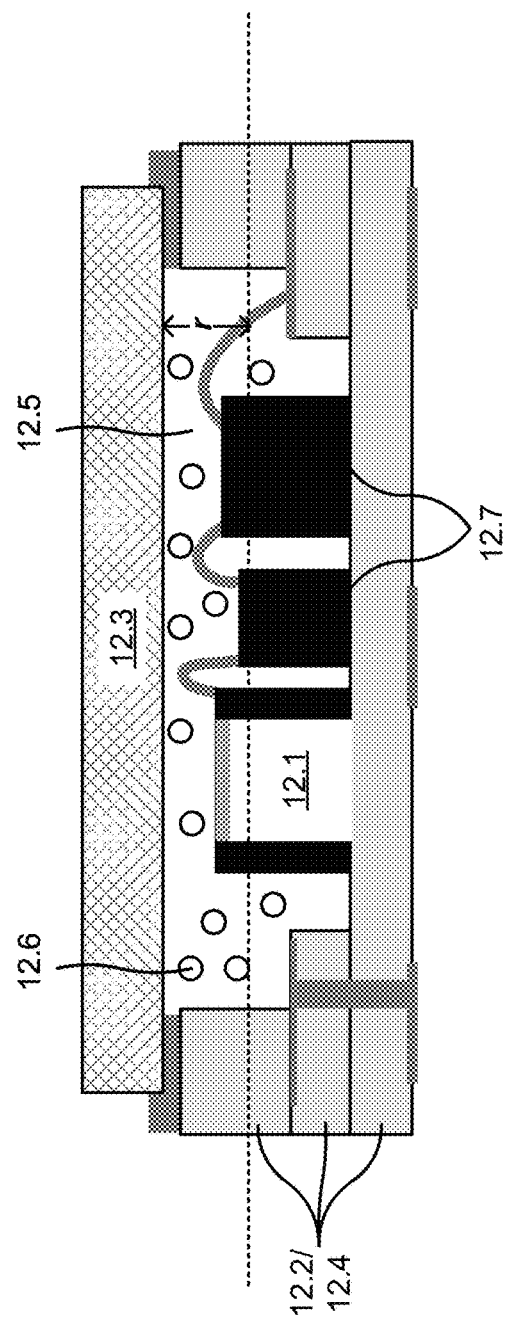

FIG. 8 is a diagram of a cross section of a detector component 12 in which reference path structure 12.4 is provided in housing 12.2 that at least partially defines reference volume 12.5.

In some implementations, reference path structure 12.4 may be provided in housing 12.2 in order to order to reduce a distance between a component of detector component 12 and light inlet window 12.3 (e.g., as compared to a distance without a typical housing 12.2) such that the length r of the reference path is less than 0.5 mm. For example, as shown in FIG. 8, housing 12.2 may be formed such that a distance between light inlet window 12.3 and pressure sensing element 12.1 and/or the one or more other components 12.7 of detector component 12 is reduced (e.g., as compared to this distance with a typical housing 12.2. In other words, in some implementations, housing 12.2 may be formed such that the length r is smaller than that provided with a typical housing 12.2. In this way, reference path structure 12.4 can be provided in housing 12.2 in order to cause the average length between light inlet window 12.3 and the interior surface of reference volume 15 to be less than 0.5 mm.

The number and arrangement of components, elements, and layers shown in FIGS. 3-4, 5A-5B, 6A-6B, 7A-7C, and 8 are provided as examples. In practice, detector component 12 may include additional components, elements and/or layers; fewer components, elements and/or layers; different components, elements and/or layers; differently arranged components, elements and/or layers; differently sized components, elements and/or layers; components, elements and/ or layers with different relative sizes; and/or the like, than those shown in FIGS. 3-4, 5A-5B, 6A-6B, 7A-7C, and 8. Additionally, or alternatively, a set of components (e.g., one or more components), a set of elements (e.g., one or more elements), and/or a set of layers (e.g., one or more layers) of detector component 12 may perform one or more functions described as being performed by another set of components, another set of elements, or another set of layers of detector component 12.

Further, while the implementations of reference path structure 12.4 described in FIGS. 3-4, 7A-7C, and 8 are provided in the context of detector components 12 that utilize ceramic packages, any of these implementations of reference path structure 12.4 can be applied to detector components 12 that utilize metallic packages (e.g., TO can packages). Additionally, two or more of the above described implementations of reference path structure 12.4 can be combined in a single detector component 12 in order to cause the length of reference path r to be less than 0.5 mm.

Some implementations described herein provide a photo-acoustic gas sensor 10 comprising an improved detector component 12 that includes a reference path structure 12.4 which causes a length r of a reference path to be less than or equal to 0.5 mm. In some implementations, the length r of the reference path may be in a range from approximately 2 mm to approximately 4 mm (e.g., as illustrated in FIGS. 1A-1D). In some implementations, as a result of the reference path having a length r that is less than 0.5 mm, the sensitivity of detector component 12 (e.g., pressure sensing element 12.1) may be in a range from 10 mPa/100 ppm to 40 mPa/100 ppm (e.g., as illustrated in FIGS. 1A-1D).

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A photo-acoustic gas sensor comprising a detector component, the detector component including: a package that defines a reference volume housing a reference gas; a light inlet window; a pressure sensing element to measure an amount of pressure in the reference volume, wherein the amount of pressure in the reference volume is dependent on absorption of a wavelength of light by the reference gas in the reference volume, wherein a sensitivity of the pressure sensing element, when measuring the amount of pressure in the reference volume, depends on a length of a reference path associated with the reference volume, and wherein the length of the reference path is defined by a length from the light inlet window to an interior surface, of the reference volume, that is directly opposed to the light inlet window; and a reference path structure that causes the length of the reference path to be less than or equal to 0.5 millimeters, wherein the photo-acoustic gas sensor is configured to have a direct path between an emitter component and the light inlet window for the light to propagate.

2. The photo-acoustic gas sensor of claim 1, wherein the reference path structure includes a fill material that at least partially defines the reference volume.

3. The photo-acoustic gas sensor of claim 1, wherein the reference path structure includes a pedestal layer within the reference volume.

4. The photo-acoustic gas sensor of claim 1, wherein the reference path structure includes a lid structure within the reference volume,
  wherein the lid structure is arranged between the pressure sensing element and the light inlet window,
  wherein the light inlet window partially defines the reference volume, and
  wherein the lid structure includes an opening that allows the pressure sensing element to measure the amount of pressure in the reference volume.

5. The photo-acoustic gas sensor of claim 4, wherein the lid structure prevents light that is transmitted through the light inlet window from being incident on the pressure sensing element.

6. The photo-acoustic gas sensor of claim 1, wherein the reference path structure includes a recessed lid that at least partially defines the reference volume.

7. The photo-acoustic gas sensor of claim 1, wherein the reference path structure is provided in a housing that at least partially defines the reference volume.

8. The photo-acoustic gas sensor of claim 1, wherein the package is a ceramic package.

9. The photo-acoustic gas sensor of claim 1, wherein the package is a metallic package.

10. The photo-acoustic gas sensor of claim 1, wherein the length of the reference path is in a range from 0.2 millimeters to 0.4 millimeters.

11. The photo-acoustic gas sensor of claim 1, wherein the sensitivity of the pressure sensing element is in a range from 10 millipascals per 100 parts per million (mPa/100 ppm) to 40 mPa/100 ppm.

12. A gas sensor, comprising: an emitter component including an emitter to emit light at a particular wavelength; and a detector component including: a light inlet window, a pressure sensing element to measure an amount of pressure in a reference volume of the detector component, wherein the reference volume houses a reference gas, wherein the amount of pressure in the reference volume is defined by absorption of the light by the reference gas, and wherein a sensitivity of the pressure sensing element depends on a length of a reference path associated with the reference volume, wherein the length of the reference path is defined by a length from the light inlet window to an interior surface, of the reference volume, that is directly opposed to the light inlet window; and a reference path structure that results in the length of the reference path being less than or equal to 0.5 millimeters, wherein the photo-acoustic gas sensor is configured to have a direct path between an emitter component and the light inlet window for the light to propagate.

13. The gas sensor of claim 12, wherein the reference path structure includes a fill material that at least partially defines the reference volume.

14. The gas sensor of claim 12, wherein the reference path structure includes a pedestal layer within the reference volume.

15. The gas sensor of claim 12, wherein the reference path structure includes a lid structure within the reference volume,
  wherein the lid structure is arranged between the pressure sensing element and the light inlet window,
  wherein the light inlet window partially defines the reference volume, and
  wherein the lid structure includes an opening that allows the pressure sensing element to measure the amount of pressure in the reference volume.

16. The gas sensor of claim 15, wherein the lid structure prevents light that is transmitted through the light inlet window from being incident on the pressure sensing element.

17. The gas sensor of claim 12, wherein the reference path structure includes a recessed lid that at least partially defines the reference volume.

18. The gas sensor of claim 12, wherein the detector component includes one of:
  a ceramic package that at least partially defines the reference volume; or
  a metallic package that at least partially defines the reference volume.

19. A detector component of a gas sensor, the detector component including: a package that defines a reference volume, wherein a reference gas is present in the reference volume; a light inlet window, a pressure sensing element to measure an amount of pressure in the reference volume, wherein the amount of pressure in the reference volume depends on absorption of a wavelength of light by the reference gas in the reference volume; and a reference path structure that causes a reference path, associated with the reference volume, to have a length that is less than or equal to 0.5 millimeters, wherein the length of the reference path is defined by a length from the light inlet window to an interior surface, of the reference volume, that is directly opposed to the light inlet window, wherein the length of the reference path causes a sensitivity of the pressure sensing element to be in a range from 10 millipascals per 100 parts per million (mPa/100 ppm) to 40 mPa/100 ppm, and wherein the photo-acoustic gas sensor is configured to have a direct path between an emitter component and the light inlet window for the light to propagate.

20. The detector component of claim 19, wherein the reference path structure is one of:
  a fill material that at least partially defines the reference volume;
  a pedestal layer within the reference volume; or
  a lid structure within the reference volume,
    wherein the lid structure is arranged between the pressure sensing element and the light inlet window,
    wherein the light inlet window partially defines the reference volume, and
    wherein the lid structure includes an opening.

* * * * *